United States Patent

[11] 3,585,470

| [72] | Inventor | John J. Connors<br>West Seneca, N.Y. |
|---|---|---|
| [21] | Appl. No. | 883,093 |
| [22] | Filed | Dec. 8, 1969 |
| [45] | Patented | June 15, 1971 |
| [73] | Assignee | Westinghouse Electric Corporation<br>Pittsburgh, Pa. |

[54] AUTOMATIC BUS VOLTAGE ADJUSTMENT CONTROL SYSTEM
6 Claims, 1 Drawing Fig.

[52] U.S. Cl............................................. 318/53,
318/112, 318/67
[51] Int. Cl............................................. H02p 7/70
[50] Field of Search............................... 318/53, 77,
80, 82, 84, 112, 67

[56] References Cited
UNITED STATES PATENTS

| 2,677,082 | 4/1954 | Allbert et al.................. | 318/112 X |
| 3,050,670 | 8/1962 | Anger et al. .................. | 318/77 X |

Primary Examiner—Oris L. Rader
Assistant Examiner—W. E. Duncanson, Jr.
Attorneys—F. H. Henson, R. G. Brodahl and J. J. Wood ABSTRACT: This disclosure relates to a system for providing automatic bus voltage adjustment control to enable an optimum bus voltage to be selected for a plurality of motors operated in parallel, in accordance with the speed selected for the lowest speed motor.

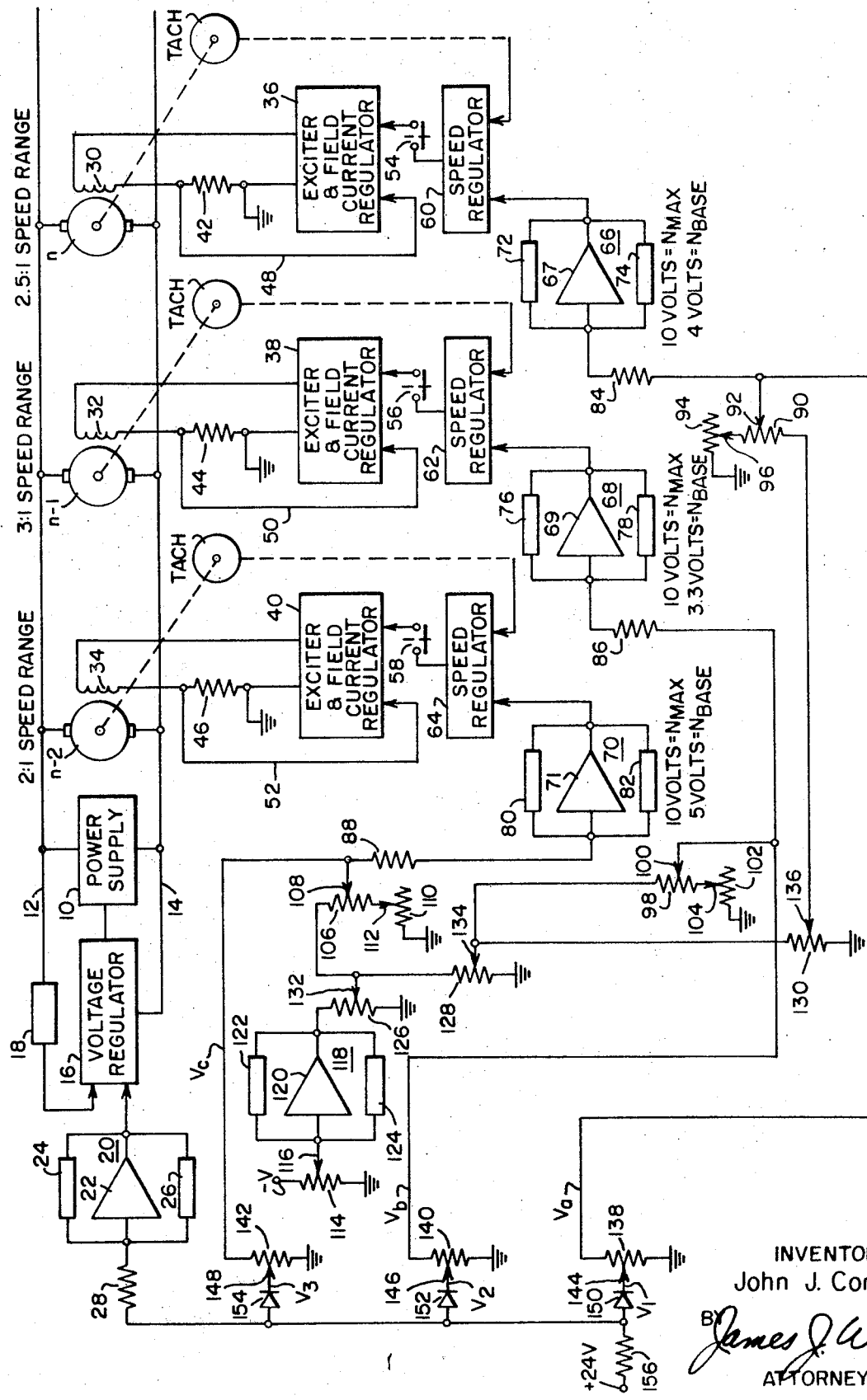

3,585,470

AUTOMATIC BUS VOLTAGE ADJUSTMENT CONTROL SYSTEM

BACKGROUND OF THE INVENTION

1. Field of the Invention

This invention relates to an automatic bus voltage control system for motors operated in parallel, wherein the optimum bus voltage is selected in response to the independently elected motor speeds.

2. Description of the Prior Art

Present day bar and rod mills are arranged in multistand array in which the respective stands are driven by DC motors energized from a common voltage supply. It is the usual practice to have this supply voltage regulated, and to have the control of each discrete motor under the discipline of separate motor shunt field speed regulators which are adjusted by the mill operator. It will readily be appreciated that the speed at each motor stand is then determined by: (a) the bus voltage, and (b) the particular setting for the motor field speed control as determined by the operator. The individual operator has manual control over both the bus voltage and the motor field current. However, as will readily be appreciated, changing the bus voltage affects the performance of all the motors, since the voltage supply is shared in common. It was thus possible that an operator may make an adjustment that would lower the bus voltage below rated value, while the motor fields would be set at some point between full field and weak field. A moment's consideration will bring to mind the attendant disadvantages with such an arrangement. For one thing the motor torque per ampere is reduced, and motor losses are increased. Additionally, if a static AC power converter is used to furnish power for the motors, it will then be operating at a greater phase angle, with concomitant reduced power factor. Since industrial consumers pay both on the basis of watts consumed as well as on the basis of power factor maintained, this would increase the cost of operation.

In those bar and rod mills which are presently powered by mercury arc rectifiers, the disadvantage is that they do not operate satisfactorily under conditions of phase delay, so that low speed operation must be achieved by selecting reduced transformer voltages. With the advent of silicon controlled rectifier power supplies, which have in large measure supplanted mercury arc rectifiers, thoughtful consideration has been given to operating bar and rod mills at reduced voltages compatible with torque required. However, despite these considerations, it should be understood that the invention to be described applies equally as well to generator power supplies in a multidrive arrangement.

SUMMARY OF THE INVENTION

The invention relates to a bus voltage control system for a plurality of electrical motors: 1, 2, .... (n−1), n operated in parallel. Means are provided for deriving n electrical signals which are functions of the speeds selected for the motors respectively. Means are also provided for selecting one electrical signal from among the plurality of n electrical signals, which is representative of the lowest speed motor. Finally, means are provided for responding to said one selected electrical signal, and for adjusting the magnitude of the bus voltage in response thereto.

Accordingly, it is an object of this invention to provide an automatic bus voltage control system in which the determination of optimum bus voltage is achieved automatically to eliminate human error based on miscalculation and carelessness, which sometimes results under stress conditions.

The novel features of the invention are set forth with particularity in the appended claims. The invention itself however both as to its organization and method of operation, together with further objects and advantages thereof may best be understood by reference to the description to follow considered in connection with the accompanying drawings.

BRIEF DESCRIPTION OF THE DRAWINGS

FIG. 1 is an electrical schematic illustrating an automatic bus voltage control system in accordance with the invention.

The automatic bus voltage control system of the instant invention is intended for use with bar and rod mills; however, it has application anywhere where a multidrive system must be utilized. In view of the fact that multistand operations are now so well known in the art, the description to follow will be directed in particular to those elements forming part of or cooperating more directly with the instant invention, and therefore, this schematic is not intended to be complete in every detail. Information concerning mill elements and/or mill functions not shown or described will be understood to be readily obtainable from commercially available sources, or in the literature, or selectable from techniques will known to those practicing in the art.

Before discussing the invention proper, it will be helpful to briefly review the environmental setting and operation of a classical bar and rod mill. Rolls are successively arranged down a process line, so that the material being processed gradually approaches the desired geometrical configuration. The rolls together with the associated supporting equipment are identified in the vernacular as mill stands, one mill stand being driven by its own DC drive motor, or one motor may drive two mill stands depending upon the particular mill operation. In hot rolling mills the heated material is advanced toward the rolls which are already in rotation, and the material is then successively run through roughing and finishing mill stands. Obviously, as the material becomes reduced, the succeeding mill stands can be operated at a higher speed. Also dependent on the particular conditions at the mill, there may be a requirement from time to time for the operator to control the speed at a particular mill stand.

Referring now to FIG. 1, a bar or rod mill system includes a power supply, indicated symbolically at 10, having bus 12 and common return 14 for supplying electrical power to a plurality of DC motors identified as: $n$, $(n-1)$, $(n-2)$. The power supply 10 is the high voltage supply available at the particular mill location. Typically, it may be a transformer that supplies three phase power at 700 volts and 60 hertz. The DC shunt motors: $n$, $(n-1)$, $(n-2)$, etc. are each arranged as the prime mover for one or more stands, (usually only one stand) where rolls are actuated to physically reduce the size of the bar or rod material passing through the mill. A voltage regulator indicated at 16 is connected to the power supply 10; in practice this may be a single converter thyristor, that is it is a silicon controlled rectifier arrangement, adapted for passing current in one direction. Included within the voltage regulator 16 are firing circuits for the thyristors, current limiting resistors etc. Feedback circuitry from the power supply 10 to the voltage regulator 16 is identified at 18. The nature of the feedback circuitry 18 depends upon the power supply selected. This circuitry derives a control signal which is a function of any change in bus voltage, the magnitude of the control signal being compatible with the voltage regulator.

A voltage regulator reference amplifier, indicated generally at 20, is connected to the input of the voltage regulator 16 and comprises an amplifier proper identified at 22, limiter 24 and impedance 26. An input resistor for the amplifier 20 is identified at 28. The limiter 24 limits the output swing of the bus voltage so that it will never exceed rated or nominal value.

Each DC motor: $n$, $n-1$, $n-2$ has its own separate field winding identified at 30, 32 and 34; each respective winding is connected to an exciter and field current regulator indicated symbolically at 36, 38, 40. Shunt resistors 42, 44 and 46 are arranged in the respective field windings 30, 32 and 34 to enable a pickoff 48, 50, 52 to be applied to the respective exciter and field current regulators 36, 38 and 40 respectively. Relay contacts, indicated symbolically at 54, 56 and 58, are actuated by sequence relays not shown on the drawing. The mill operator makes a decision to open or close the respective contacts (54, 56, 58). When the contacts are open, the mill stand plays no active role in the mill process. Contrariwise, when the operator makes a decision to close one or more of these contacts, this means that the mill stand associated with the closed contacts, is to be an active stand, and additionally, that it is elected to have the associated drive motor speed regulated. The speed regulators for the motors: $n$, $(n-1)$, $(n-2)$ are identified at 60, 62 and 64. The input to the speed regulators are controlled by limiter amplifiers identified generally at: 66, 68 and 70 respectively. The limiter amplifiers 66, 68 and 70, respectively include amplifiers 67, 69, 71, limiters 72, 76, 80, impedances 74, 78, 82 with input resistors at 84, 86, 88. The input resistors 84, 86, 88 are connected to wipers 92, 100, 108 of potentiometers 90, 98, 106, respectively, which are in series with vernier speed change rheostats 94, 102 and 110, respectively, the movable contacts of which are identified at 96, 104 and 112, respectively.

A master potentiometer 114 having a wiper 116 is connected between a source of potential $-V$ and ground. The wiper 116 is connected to the input of limiter amplifier identified generally at 118, and comprising an amplifier proper 120, with limiter and impedance at 122 and 124 respectively. The output of limiter amplifier 118 is coupled to speed change potentiometer 126, 128 and 130 arranged in cascade. The wipers 132, 134 of speed change potentiometers 126 and 128 determine the maximum voltage excursions of the succeeding potentiometers 128 and 130 as shown. Additionally, the wipers 132, 134 and 136 determine the maximum voltage excursions of the coarse-vernier speed control elements 106, 110, 98, 102; and 90, 94 by reason of the connections indicated.

Potentiometers identified at 138, 140 and 142, have one end connected to the input resistors 84, 86, 88 respectively of the amplifiers 66, 68, 70; the other ends of these potentiometers 138, 140 and 142 are connected to ground. Diodes 150, 152 and 154 form a diode selection matrix having their respective cathodes connected to the wipers 144, 146 and 148 of the potentiometers 138, 140 and 142, and their anodes connected in common to a positive volt supply through a resistor 156. The common anode connection for the diode selection matrix is connected to the input resistor 28 of the voltage regulator reference amplifier 20.

OPERATION OF THE SYSTEM

In order to make the operation clear it will be helpful to assume some empirical values such as encountered in practice. The DC motors by design are operated between maximum field flux and weak field flux.

The amplifiers 66, 68 and 70 are designed so as to have an output swing between +10 v. and 0. Assume each of these amplifiers is adjusted to have the voltage swing between base speed $N_b$ and maximum speed $N_{max}$ as indicated on the drawing. The operator at his mill stand uses the coarse speed potentiometer i.e. 90, 98, 106 with which to make an adjustment, which in effect changes the input to the amplifier 66, 68 and 70 respectively; at the same time further incremental changes in speed may be accomplished by the vernier speed change rheostats 94, 102, 110 associated with each of these amplifiers.

Let us assume that the motors: $n$, $n-1$, and $n-2$ have speed ranges in the proportion 2.5:1, 3:1 and 2:1 respectively as indicated in the drawing. Assume further that mill conditions dictate adjustments so that the motor $n$ is operating at maximum field, motor $(n-1)$ is at some percentage of weak field, and that motor $(n-2)$ is at minimum field. In terms of speed, motor $n$ is operating at base speed, motor $(n-1)$ is operating at somewhere between base and maximum speed, while motor $n-2$ is operating at maximum speed.

The voltages $Va$, $Vb$ and $Vc$ indicated in the drawing are at the following potentials: $Va$ is equal to 4 volts, $Vb$ is at say 9 volts and $Vc$ is at 10 volts. This is readily ascertainable from the following facts. The $n$th motor is at base speed which is equal to 4 volts as indicated on the drawing. The $(n-1)$ motor is arbitrarily selected to be 9 volts, since it is operating somewhere between base speed and maximum speed, while the $(n-2)$ motor is at maximum speed which is indicated to be 10 volts.

The potentiometers 138, 140 and 142 are intended to normalize the voltages to be in harmony with the excursions selected for the amplifier 20 which is this practice embodiment was +3 v. to 0V. Accordingly, the voltages that are picked off by the wipers 144, 146 and 148 ($V_1$, $V_2$ and $V_3$) are:
$V_1 = 3/4$ of 4 volts = 3 volts
$V_2 = {}^{of}$ 9 volts = 8.2 volts
$V_3 = {}^{of}$ 10 volts = 6 volts.

The voltages therefore are as follows: $V_1$ equals 3 volts, $V_2$ equals 8.2 volts, $V_3$ equals 6 volts. The diode 150 conducts and the remaining diodes are then back biased, with the result that the potential selected is that of the lowest voltage namely, 3 volts which appears on $V_1$.

As previously indicated the amplifier 20 is arranged so that the output swing is +3 volts to 0 volts. When the voltage of amplifier 20 is +3 volts (as in the case selected) then the voltage between the bus 12 and return 14 is 700 volts; this is applied to all the motors. The three volts input to the voltage regulator reference amplifier 20, then results in an output of 3 volts which for example may be equated to a bus voltage of 700 V.

If now, suppose that it is desired to operate the motor $n$ below base speed. The operator would make his adjustments and the amplifier 66 would swing below 4 volts. Assume that the voltage fell to 1⅓ volts, $V_1$, would be equal to three-fourths of 1⅓ volts = 1 volt. $V_3$ would still be equal to 6 volts, $V_2$ would still be 8.2 volts but $V_1$ would be equal to 1 volt. The diode 150 would then conduct selecting the one volt, and this would appear at the output of the amplifier 20. The bus voltage would then drop to one-third of 700 volts or about 233 volts. Motor $n$ would be at maximum flux, motor $(n-1)$ would be somewhere between weak and maximum flux and motor $n-2$ would be at minimum flux. This result is highly desirable for the reason that DC shunt motors are operated between maximum field and weak field, or maximum field which is base speed and weak field which is maximum speed. The motor is not designed to operate at less than the weak field. Accordingly, when the operator calls for a speed which is below base, the only way in which the motor can safely comply is to reduce the bus voltage. This has been done by the diode selection matrix which responds to the lowest voltage which is a function of the lowest speed selected, and therefore calls for the optimum bus voltage to be applied to all motors. The advantage of keeping the flux in the range between maximum and weak field resides in the fact that torque is maximized since torque varies directly with flux.

Master potentiometer 114 provides the mill operator with greater flexibility in terms of voltage control. For example, should the operator wish to raise the overall bus voltage load, thereby adjusting the potentiometer 114, the input to the limiter amplifier 118 is altered, changing its output in the desired direction. The output voltage change of limiter amplifier 118 is then cascaded through potentiometers 126, 128, 130, thereby affecting all associated drive motors.

The invention has been described in detail with reference to preferred embodiments thereof but it will be understood that variations and modifications can be effected within the spirit and scope of the invention as described hereinabove and as defined in the appended claims.

I claim:
1. A bus voltage control system for a plurality of motors: 1, 2, .... $(n-1)$, $n$ operated in parallel comprising
    a. means for deriving $n$ electrical signals which are functions of the speeds selected for the motors respectively,
    b. means for selecting one electrical signal from among the $n$ electrical signals which is a function of the lowest speed motor, and
    c. means for adjusting the magnitude of said bus voltage in response to said one electrical signal.

2. A bus voltage control system for a plurality of motors, 1, 2, .... (n–2), (n–1), n operated electrically in parallel, comprising
   a. means for deriving a voltage signal for each motor of said plurality as a function of the speed selected for each of said motors respectively,
   b. means for selecting the voltage signal of lowest magnitude from among such a plurality of voltage signals, and
   c. means for adjusting the magnitude of said bus voltage as a function of said selected lowest magnitude voltage signal.

3. A bus voltage control system for a plurality of motors, 1, 2, .... (n–1), n operated in parallel, comprising
   a. means for deriving n electrical signals which are functions of the speeds selected for the motors respectively,
   b. means for selecting one electrical signal from among the n electrical signals, which selected signal is a function of the motor of lowest speed,
   c. means for receiving said one selected electrical signal and providing a limited linear output, and
   d. means for receiving said limited linear output and delivering a bus voltage, variable within a predetermined range which is a function of said one selected electrical signal.

4. A bus voltage control system for a plurality of motors 1, 2 .... (n–1), n operated in parallel comprising
   a. means for adjusting the speed of said n motors,
   b. means coupled to said speed adjusting means for deriving n electrical signals which are functions of said adjusted speed respectively,
   c. means for normalizing said n electrical signals on the basis of a predetermined electrical magnitude,
   d. means for selecting one electrical signal from among the normalized n electrical signals, which selected signal is representative of the lowest speed motor,
   e. means for receiving said selected electrical signal and delivering an output within a predetermined signal range, and
   f. means for receiving said predetermined signal range output and delivering a bus voltage variable in accordance with the speed of the lowest motor.

5. A bus voltage control system for a plurality of motors 1, 2, .... (n–1), n, operated in parallel from a power supply comprising
   a. means for adjusting the speed of said n motors,
   b. means coupled to said speed adjusting means for developing n electrical signals which are functions of said adjusted speeds respectively,
   c. means for normalizing said n electrical signals on the basis of a predetermined electrical signal magnitude,
   d. means for selecting one electrical signal from among the normalized n electrical signals, which selected signal is representative of the lowest speed motor,
   e. means for receiving said selected electrical signal and delivering a voltage regulator reference signal which is a function of the lowest speed motor, and
   f. means for voltage regulation coupled to said power supply, adapted to receive said voltage regulator signal and deliver a control signal which adjusts the output magnitude of said power supply as a function of the lowest speed motor.

6. A bus voltage control system according to claim 5 in which
   a. said selecting means comprises diode selection network means electrically arranged to block all said normalized n electrical signals but said one selected electrical signal.